United States Patent
Wang

(10) Patent No.: US 10,742,330 B2
(45) Date of Patent: Aug. 11, 2020

(54) MEASUREMENT DEVICE

(71) Applicant: Lumentum Operations LLC, Milpitas, CA (US)

(72) Inventor: Shumin Wang, Shenzhen (CN)

(73) Assignee: Lumentum Operations LLC, Milpitas, CA (US)

(*) Notice: Subject to any disclaimer, the term of this patent is extended or adjusted under 35 U.S.C. 154(b) by 211 days.

(21) Appl. No.: 15/922,243

(22) Filed: Mar. 15, 2018

(65) Prior Publication Data
US 2019/0288779 A1    Sep. 19, 2019

(51) Int. Cl.
*H04B 10/80* (2013.01)
*H04B 10/079* (2013.01)

(52) U.S. Cl.
CPC ..... *H04B 10/807* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 6,392,746 B1* | 5/2002 | Buerli | ............... | G01J 1/4257 250/227.14 |
| 6,629,638 B1* | 10/2003 | Sanchez | ............... | G01R 31/002 235/454 |
| 2003/0165009 A1* | 9/2003 | Olivier | ............... | G01J 1/42 359/341.41 |
| 2005/0184221 A1* | 8/2005 | Chien | ............... | G01J 1/46 250/214 R |
| 2014/0240698 A1* | 8/2014 | Wagner | ............... | G01J 1/4257 356/218 |

* cited by examiner

*Primary Examiner* — Paresh Patel
(74) *Attorney, Agent, or Firm* — Harrity & Harrity, LLP

(57) ABSTRACT

A measurement device may include a bias source to provide a bias, a photodiode to provide a linear current based on an input optical power and the bias, a log amplifier to receive the linear current and to provide a voltage, and one or more processors to receive the voltage and to determine a measurement of the input optical power at an observed temperature. The measurement may be determined based on a photodiode current corresponding to the voltage, a dark current, and a calibration current. The calibration current may be determined, for a threshold power range, based on a first plurality of current measurements at a first temperature and at a plurality of optical powers, a second current measurement at a second temperature and at a first optical power, and a third current measurement at the second temperature and at a second optical power.

20 Claims, 7 Drawing Sheets

MEASUREMENT DEVICE

TECHNICAL FIELD

The present disclosure relates to measurement devices. More particularly, some aspects of the present disclosure relate to a measurement device to determine an input optical power to a photodiode with improved accuracy relative to other techniques for determining the input optical power.

BACKGROUND

A measurement device may include a photodiode that may be exposed to light associated with a particular input optical power. The photodiode may generate a current based on the particular input optical power. A processor may receive the current and may determine the particular input optical power based on the current. In some cases, the current may be less than a threshold, which may prevent the processor from accurately determining the particular input optical power. As a result, an amplifier, such as a log amplifier, may be included in the measurement device to receive the current and to provide an amplified current to the processor to enable the processor to determine the particular input optical power.

A determination of the particular input optical power may be temperature dependent. For example, the current provided by the photodiode, the current provided by the amplifier, and/or the like may be affected by changes to an operating temperature of the measurement device. When the particular input optical power is less than a threshold, a temperature change from a calibration temperature of the measurement device may result in an accuracy of the measurement device being less than is desired for a particular system.

SUMMARY

According to some possible implementations, a measurement device may include a bias source to provide a bias. The measurement device may include a photodiode to provide a linear current based on an input optical power and the bias. The measurement device may include a log amplifier to receive the linear current and to provide a voltage. The measurement device may include one or more processors to receive the voltage and to determine a measurement of the input optical power at an observed temperature. The measurement may be determined based on a photodiode current corresponding to the voltage, a dark current for the observed temperature, and a calibration current for the observed temperature. The calibration current may be determined, for a threshold power range, based on a first plurality of current measurements at a first temperature and at a plurality of optical powers, a second current measurement at a second temperature and at a first optical power, of the plurality of optical powers, and a third current measurement at the second temperature and at a second optical power, of the plurality of optical powers.

According to some possible implementations, a method may include determining, by a device, a first plurality of current measurements at a first temperature and at a plurality of optical powers. The method may include determining, by the device, a second current measurement at a second temperature and at a first optical power, of the plurality of optical powers. The method may include determining, by the device, a third current measurement at the second temperature and at a second optical power, of the plurality of optical powers. The method may include determining, by the device, a calibration current for an observed temperature and a threshold power range based on the first plurality of current measurements, the second current measurement, and the third current measurement. The method may include determining, by the device, a photodiode current for the observed temperature. The method may include determining, by the device, a dark current for the observed temperature. The method may include determining a measurement of an input optical power at the observed temperature based on the calibration current, the photodiode current, and the dark current.

According to some possible implementations, a device may include a processor to determine a measurement of an input optical power at an observed temperature and to output information identifying the measurement of the input optical power at the observed temperature. The measurement may be determined based on a photodiode current corresponding to a voltage, a dark current for an observed temperature, and a calibration current for the observed temperature. The calibration current for the observed temperature may be determined based on a plurality of current measurements performed at a plurality of optical powers and at a first temperature and a second temperature.

DETAILED DESCRIPTION

The following detailed description of example implementations refers to the accompanying drawings. The same reference numbers in different drawings may identify the same or similar elements.

A measurement device may include a photodiode that generates current based on an input optical signal (e.g., light). A processor may receive the current, such as after amplification by an amplifier, and may determine an input optical power of the input optical signal. However, a change to a temperature of the measurement device from a calibration temperature of the measurement device may cause the current to be altered, which may cause the processor to determine an inaccurate input optical power. The measurement device may prevent the temperature change from the calibration temperature by including a thermoelectric cooler (TEC) module and a TEC controller to maintain the measurement device within a threshold amount of the calibration temperature. However, including a TEC module and a TEC controller to maintain components of the measurement device at the calibration temperature may result in increased circuit complexity, increased cost, larger form-factor, and/or the like.

The measurement device may account for the temperature change using an estimation procedure. In the estimation procedure, the processor may be calibrated for multiple calibration temperatures, and may use a measurement of the operating temperature to interpolate and/or extrapolate based on the multiple calibration temperatures. However, the estimation procedure may result in less than a threshold level of accuracy, which may not be desirable for some applications. Moreover, calibration at multiple calibration temperatures may result in increased calibration time, increased cost for calibration, and/or increased utilization of processing resources to perform the calibration, memory resources to store calibration data relating to the calibration, and/or the like.

Some implementations, described herein, may provide a measurement device with improved measurement accuracy. For example, the measurement device may utilize a corrected power curve that is adjusted for a particular temperature range to account for temperature-dependent current changes to determine an input optical power of an input optical signal received by the measurement device. In this way, the measurement device may enable an optical power measurement system with improved accuracy relative to using an estimation procedure and reduced cost relative to including a TEC module and TEC controller in the measurement device.

Figure 1:
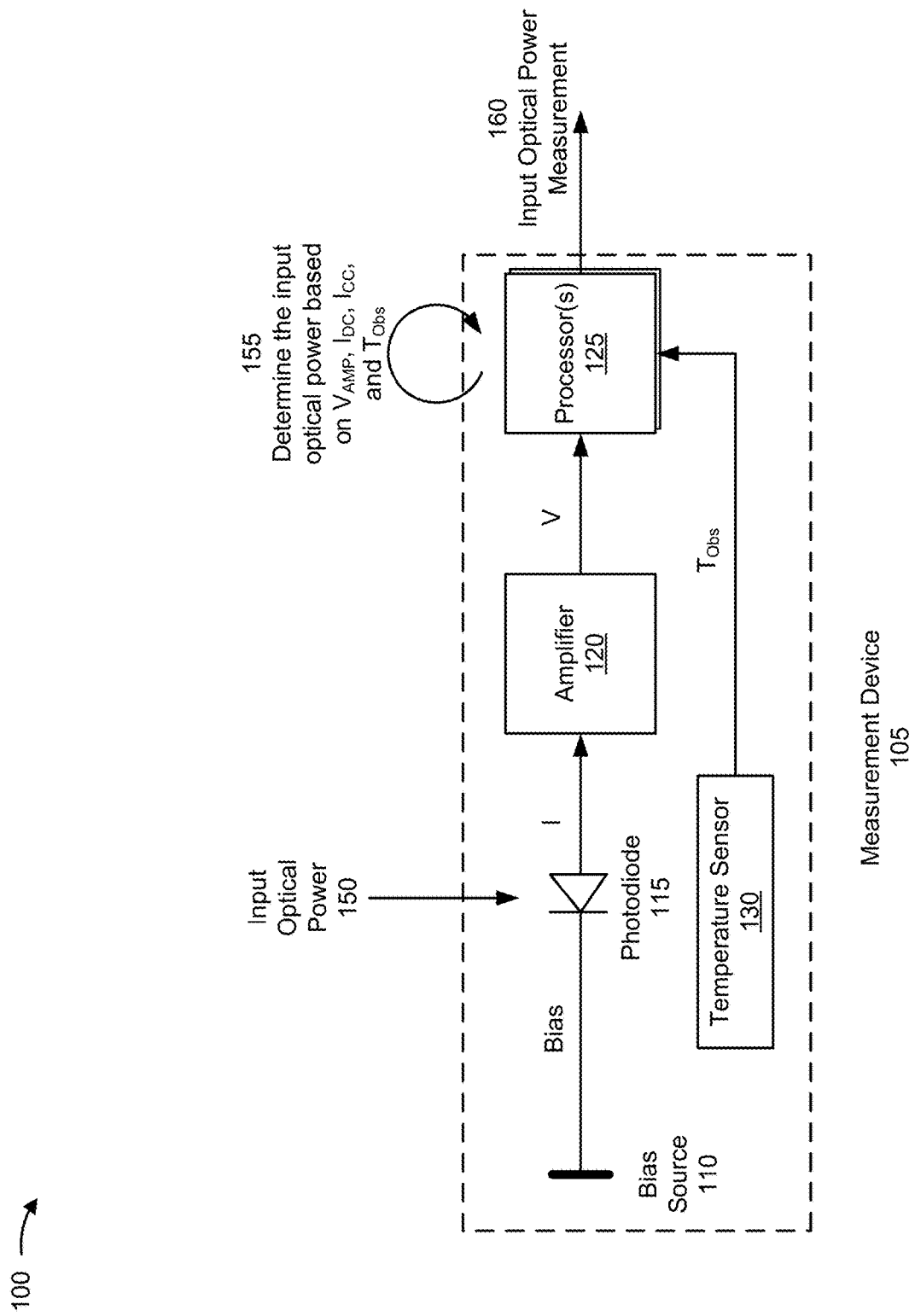
FIG. 1 is a diagram of an overview of an example implementation described herein.

FIG. 1 is a diagram of an overview of an example implementation 100 described herein. As shown in FIG. 1, example implementation 100 may include a measurement device 105, which may include bias source 110, photodiode 115, amplifier 120, one or more processor(s) 125, and temperature sensor 130.

As further shown in FIG. 1, and by reference number 150, photodiode 115 may receive an input optical signal with a particular input optical power based on an optical beam being directed to photodiode 115. Based on the input optical power of the input optical signal and a bias applied by bias source 110, photodiode 115 may provide a linear current, I, to amplifier 120. Amplifier 120 may be a log amplifier that provides a voltage, V, corresponding to I to processor 125. As shown by reference number 155, processor 125 may determine the input optical power. For example, processor 125 may determine a measurement of the input optical power based on the voltage and an observed temperature, $T_{Obs}$. In this case, temperature sensor 130 may determine the observed temperature and may provide information identifying the observed temperature to processor 125.

In some implementations, based on the voltage and the observed temperature, processor 125 may determine a photodiode current, a dark current, a calibration current, and/or the like, and may determine the input optical power. In this case, processor 125 may determine the input optical power based on the photodiode current, the dark current, the calibration current, a corrected power curve related thereto, and/or the like, as described in more detail herein. As shown by reference number 160, based on determining the input optical power, processor 125 may provide information identifying the input optical power as output, such as measurement information identifying the measurement of the input optical power.

In some implementations, processor 125 is implemented in hardware, firmware, or a combination of hardware and software. Processor 125 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 125 includes one or more processors capable of being programmed to perform a function. In some implementations, processor 125 may be associated with a memory, such as a memory to store one or more constants that are to be used in determining the input optical power, a memory to store a power curve that is to be corrected based on an observed temperature to determine the input optical power, and/or the like.

As indicated above, FIG. 1 is provided merely as an example. Other examples are possible and may differ from what was described with regard to FIG. 1.

Figure 2:
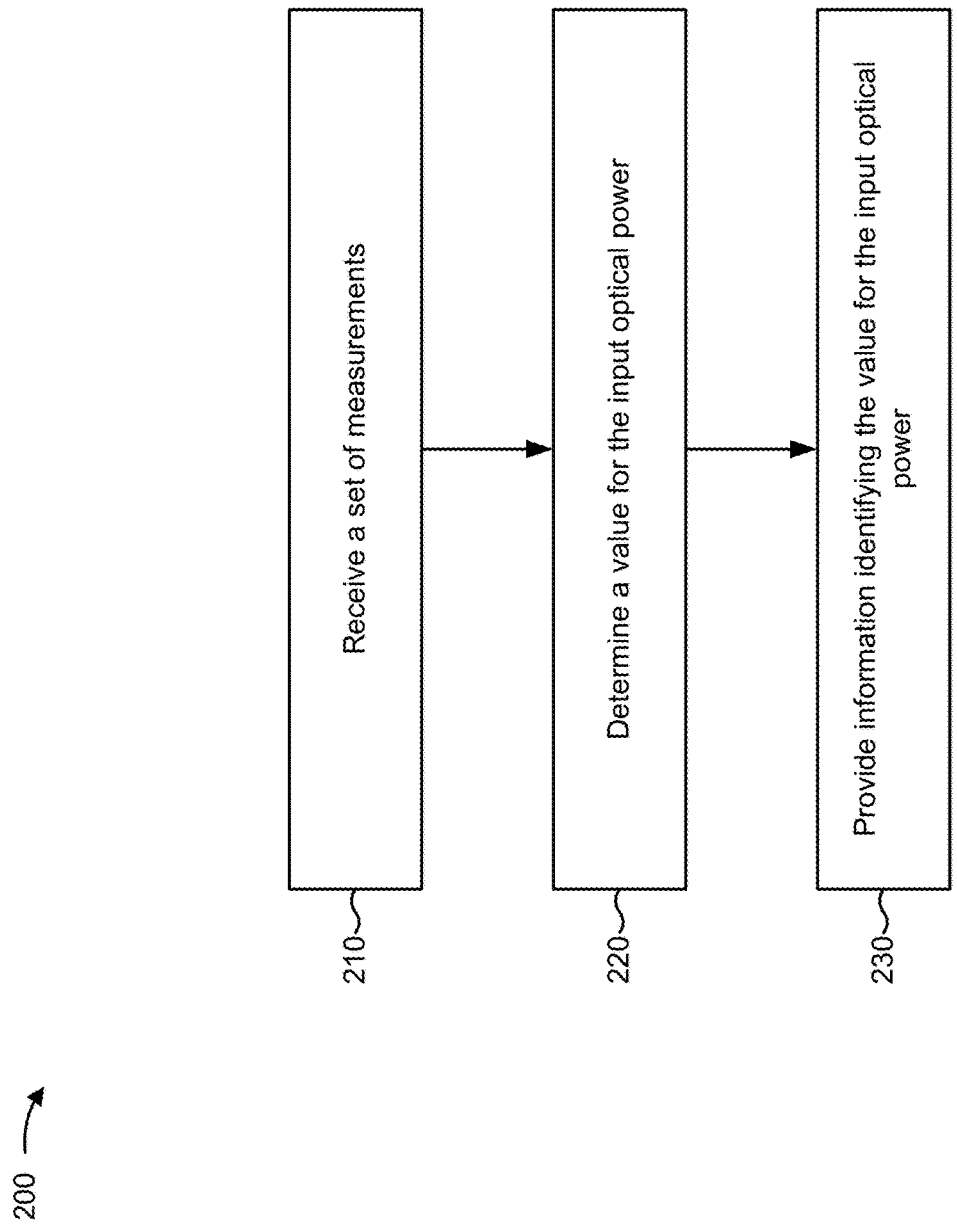
FIG. 2 is a flow chart of an example process for determining a value for an input optical power.

FIG. 2 is a flow chart of an example process 200 for determining an input optical power. In some implementations, one or more process blocks of FIG. 2 may be performed by processor 125. In some implementations, one or more process blocks of FIG. 2 may be performed by another device or a group of devices separate from or including processor 125, such as a calibration device. FIGS. 3A-3E are diagrams relating to the example process 200. FIGS. 3A-3E show examples relating to optical power determination using measurement device 105.

As shown in FIG. 2, process 200 may include receiving a set of measurements (block 210). For example, processor 125 of measurement device 105 may receive the set of measurements. In some implementations, processor 125 may receive one or more measurements relating to an input optical power to photodiode 115. For example, processor 125 may receive an input voltage from amplifier 120, which may correspond to a current received by log amplifier 120 from photodiode 115. Additionally, or alternatively, processor 125 may receive a temperature measurement. For example, processor 125 may receive information identifying an observed temperature measurement of measurement device 105, thereby enabling processor 125 to account for temperature dependency of the current provided by photodiode 115 when determining the input optical power to photodiode 115.

In some implementations, processor 125 may receive information identifying the optical power. For example, during calibration of measurement device 105, photodiode 115 may be exposed to a set of conditions (e.g., a dark condition without an input optical power, a set of light conditions with a set of corresponding known optical powers, a set of temperature conditions, and/or the like). In this case, using the set of known optical powers (e.g., optical powers less than −55 dBm, optical powers greater than −45 dBm, optical powers greater than −3 dBm, optical powers between 1 dBm and 2 dBm, an optical power of 67 dBm, and/or the like with a step size of 1 dBm) and at a set of known temperatures (e.g., a first known temperature 25 degrees Celsius (C) and a second known temperature 70 C), processor 125 may determine a set of constants for use in determining an unknown input optical power at a subsequent time, as described in more detail herein.

As shown in FIG. 2, process 200 may include determining a value for the input optical power based on the set of measurements of the input optical power (block 220). For example, processor 125 may determine the value for the input optical power based on the set of measurements.

Figure 3A:
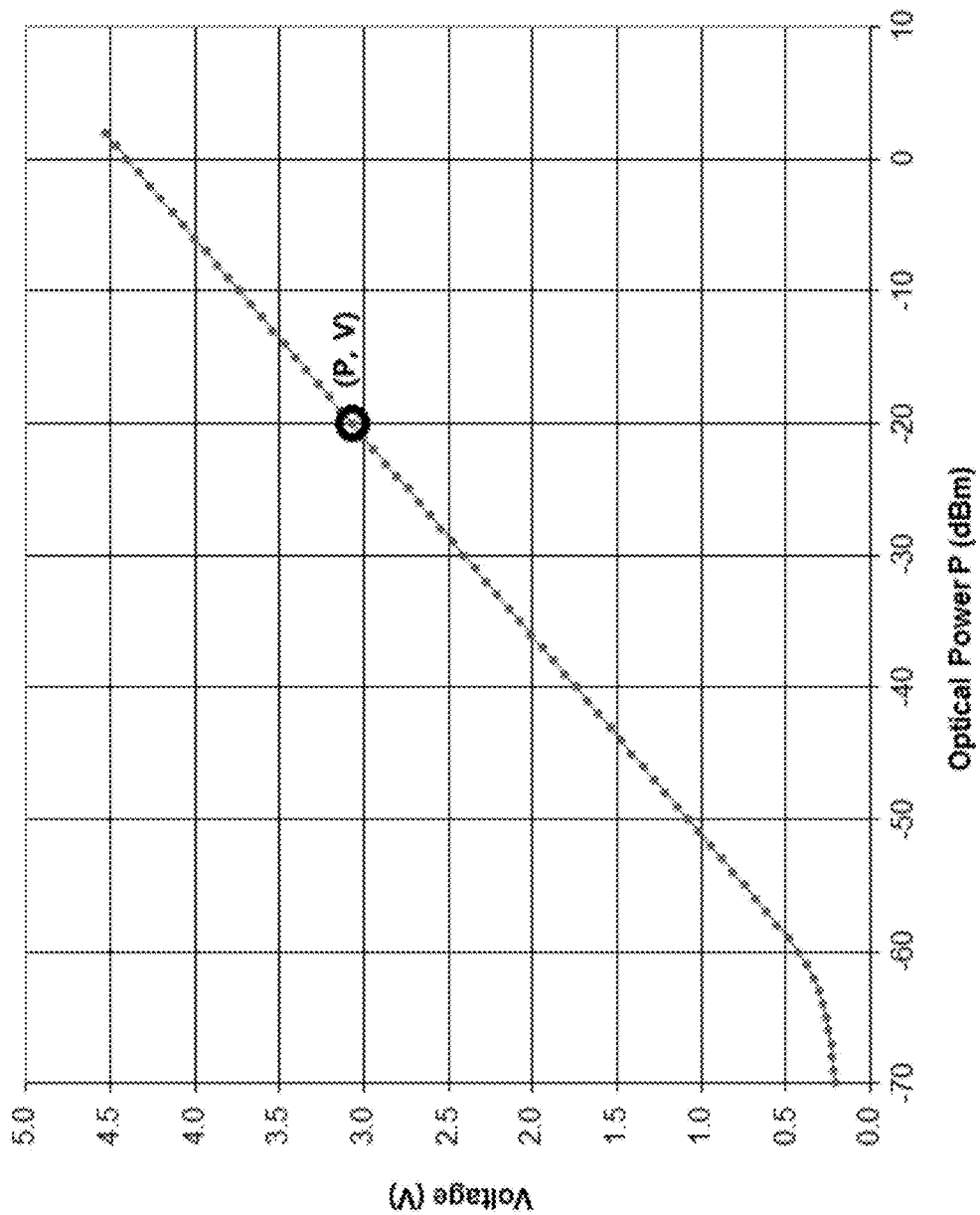
FIGS. 3A-3E are diagram relating to the example process shown in FIG. 2.
Figure 3B:
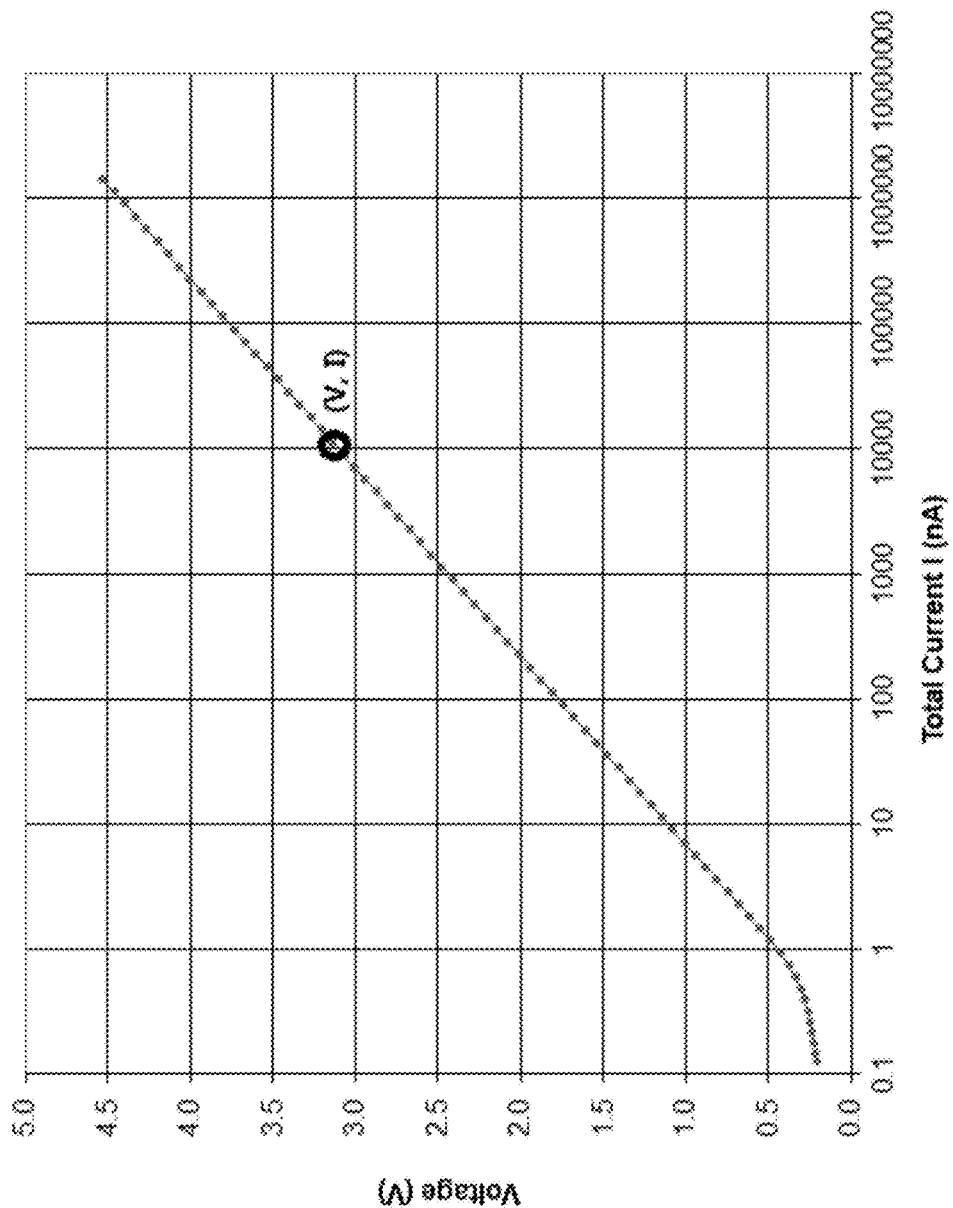

In some implementations, processor 125 may determine a power curve for measurement device 105, as shown in FIG. 3A, and by chart 310. The power curve may represent voltage from amplifier 120 as a function of input optical power to photodiode 115. In this case, the power curve is determined at a calibration temperature (e.g., 25 degrees Celsius (C)). As shown, based on the power curve, an input optical power may be determined based on a voltage input to processor 125. However, the power curve may be inaccurate as a result of multiple factors, such as based on a temperature dependency, as described herein. Thus, processor 125 may correct the power curve. In some implementations, to correct the power curve, processor 125 may convert the power curve to a current curve and may determine a corrected current curve based on the current curve, as shown in FIG. 3B, and by chart 320. In this case, the corrected current curve is determined with respect to the calibration temperature. The corrected current curve may identify voltage from amplifier 120 as a function of input current to amplifier 120, and may be determined as described herein.

In some implementations, processor 125 may determine an input current to amplifier 120. For example, processor 125 may determine a value for an equation:

$$I = I_{PD} + I_{DC} + I_{CC} \quad (1)$$

where I represents a total input current to amplifier 120; $I_{PD}$ represents a photodiode current input into amplifier 120 (e.g., a portion of the total input current relating to the optical power input to photodiode 115); $I_{DC}$ represents a dark current value input into amplifier 120 (e.g., a portion of the total input current relating to current that is provided by the photodiode 115 under a dark condition); and $I_{CC}$ represents a calibration current value input into amplifier 120 (e.g., a portion of the total input current relating to leakage current).

In some implementations, processor 125 may determine a value for the dark current. In some implementations, the dark current value may relate to a measured current from photodiode 115 based on an input bias from bias source 110 and under a dark condition (e.g., without input optical power), and may be temperature dependent. For example, processor 125 may determine an equation:

$$I_{DC,T_{Obs}} = I_{DC,T_{Cal}} * 2^{((T_{Obs}-T_{Cal})/K_{DC})} \quad (2)$$

where $I_{DC,T(Obs)}$ represents the dark current value at an observed temperature, $T_{Obs}$, $I_{DC,T(Cal)}$ represents the dark current value at the calibration temperature $T_{Cal}$ (e.g., 25 degrees Celsius (C)), and $K_{DC}$ represents an experimentally derived dark current constant for a type of photodiode 115 included in measurement device 105. For example, $K_{DC}$ may be 10, or approximately 10, for a particular type of measurement device 105.

In some implementations, processor 125 may determine the dark current value at the calibration temperature by performing a calibration procedure (e.g., at a time before processor 125 is to determine the dark current value at the observed temperature, such as during manufacture, before shipping to a customer, and/or the like). For example, the calibration procedure may include exposing photodiode 115 to a dark environment at a set of calibration temperatures, and processor 125 measuring a current from photodiode 115 under the dark environment at the set of calibration temperatures to determine the values for $I_{DC,TCal}$ at one or more of the calibration temperatures and $K_{DC}$. In this case, processor 125 may store the dark current value and the dark current constant based on performing the calibration procedure. In some implementations, processor 125 may receive stored information identifying the dark current value at the calibration temperature and/or the dark current constant based on another device performing the calibration procedure (e.g., another processor 125, a calibration device, and/or the like).

In some implementations, processor 125 may determine a value for a calibration current. For example, processor 125 may determine the calibration current for a particular power range based on first current measurements at a first temperature (e.g., 25 C) and at multiple optical powers with a step size of 1 dBM, a second current measurement at a second temperature an optical power of the multiple optical powers (e.g., at 70 C for a low optical power, such as less than −55 dBm, approximately 67 dBm, and/or the like), and a third current measurement at the second temperature and at another optical power of the multiple optical powers (e.g., at 70 C for a high optical power, such as greater than −45 dBm, greater than −3 dBm, between 1 dBm and 2 dBm, and/or the like), as described herein. Although described herein in terms of calibration of curves and graphs, processor 125 may determine and/or receive a set of values or another data type for use in calibration.

The calibration current value may, in some implementations, relate to a leakage current for amplifier 120, a leakage current for a printed circuit board (PCB) onto which measurement device 105 is fabricated, a leakage current relating to an electrical path of the PCB, and/or the like. For example, processor 125 may determine a result of an equation:

$$I_{CC,T_{Obs}} = I_{CC,T_{Cal}} 82^{(T_{Obs}-T_{Cal})/K_{CC}} \quad (3)$$

where $I_{CC,T(Obs)}$ represents the calibration current for an observed temperature $T_{Obs}$, $I_{CC,T(Cal)}$ represents the calibration current for a calibration temperature $T_{Cal}$, and $K_{CC}$ represents an experimentally derived calibration current constant for a type of photodiode 115 included in measurement device 105. Based on equation (4) (below), a calibration current is exponentially temperature dependent. In some implementations, $K_{CC}$ may be 7.4, or approximately 7.4, in a particular type of photodiode 115.

In some implementations, processor 125 may determine the calibration current value at the calibration temperature by performing a calibration procedure (e.g., at a time before processor 125 is to determine the calibration current value at the observed temperature, such as during manufacture, before shipping to a customer, and/or the like). For example, the calibration procedure may include calibrating and/or determining the optical power curve in an optical range (e.g., to determine a corrected power curve, as described herein) and at a calibration temperature, determining an output voltage of amplifier 120 under one or more light conditions (e.g., a dark condition, a light condition, and/or the like) at a set of calibration temperatures, and interpolating using the optical power curve and the voltage values for the set of calibration temperatures. In some implementations, processor 125 may calibrate the optical power curve at a first calibration temperature and for a particular optical power range. For example, processor 125 may calibrate the optical power curve at 25 degrees C. and for a range of −67 decibel-milliWatts (dBm) to 2 dBm in a step size of 1 dBm. In this case, optical power to photodiode 115 may be removed and temperature may be set to a second calibration temperature, such as 70 degrees C. In some implementations, processor 125 may determine a voltage associated with the second calibration temperature. For example, processor 125 may determine voltage from amplifier 120 at the second calibration temperature, and may use linear interpolation on the optical power curve at the first calibration temperature to determine an optical power and/or a current. In this case, processor 125 may determine $I_{CC,T(Cal)}$ and/or $K_{CC}$ using the results of the linear interpolation and a result of the set of equations. For example, processor 125 may determine a result of a set of equations:

$$I_{70} = I_{CC_{70}} + I_{DC_{70}} \quad (4)$$

$$I_{CC_{70}} = I_{CC_{25}} * 2^{\wedge}\left(\frac{(70-25)}{K_{CC}}\right) \quad (5)$$

$$I_{DC_{70}} = I_{DC_{25}} * 2^{\wedge}\left(\frac{(70-25)}{K_{DC}}\right) \quad (6)$$

-continued $$I_{25} = I_{CC_{25}} + I_{DC_{25}} + I_{PD_{25}} \quad (7)$$

$$I_{PD_{25}} = 10^{\frac{P}{10}} * R_{PD} \quad (8)$$

where $I_{70}$ is determined using the linear interpolation and $R_{PD}$ is a responsivity constant relating to photodiode 115, which may be determined experimentally. Based on determining a value for $K_{CC}$ and $I_{CC,25}$ using equations (4) through (8) and the results of linear interpolation, processor 125 may use 25 degrees C. as a calibration temperature for determining a calibration current at another temperature as shown in equation (3). In some implementations, processor 125 may receive stored information identifying the calibration current value at the calibration temperature and/or the calibration current constant based on another device performing the calibration procedure (e.g., another processor 125, a calibration device, and/or the like).

In some implementations, processor 125 may determine a value for a photodiode current. For example, processor 125 may determine a result of an equation:

$$I_{PD,T_{Obs}} = 10 * 10^{(P/10)} * R_{PD} \quad (9)$$

$$I_{PD,T_{Obs}} = I - I_{CC,T_{Obs}} - I_{DC,T_{Obs}} \quad (10)$$

where $I_{PD,T(Obs)}$ is the photodiode current at an observed temperature $T_{Obs}$, P is the input optical power to photodiode 115, $R_{PD}$ is a responsivity parameter of photodiode 115, which may be obtained experimentally, and I is a current value at a measured voltage V, which may be obtained from interpolation at a particular range of current values using, for example, chart 320, shown in FIG. 3B.

In some implementations, processor 125 may correct the power curve shown in chart 310 in FIG. 3A to enable use of chart 320 in FIG. 3B at another particular range of current values, thereby accounting for an approximately linear effect of temperature on optical power at optical powers approximately greater than or equal to −33 dBm. For example, processor 125 may determine a slope value for the power curve for a particular optical power range:

$$a_{T_{Obs}} = a_{T_{Cal}} + k_{slope}(T_{Obs} - T_{Cal}) \quad (11)$$

where $a_{T(Obs)}$ represents a corrected slope of the power curve for a particular optical power range and at an observed temperature $T_{Obs}$, $a_{T(Cal)}$ represents a slope of the power curve for the particular optical power range at a calibration temperature $T_{Cal}$, and $k_{slope}$ represents an experimentally derived slope constant. In some implementations, the particular optical power range may be between approximately −33 dBm and approximately 2 dBm. In some implementations, $k_{slope}$ may be temperature independent, thereby enabling processor 125 to determine or be configured with a value for $k_{slope}$ determined using two or more calibration temperatures (e.g., $T_1$=25 degrees C. and $T_2$=70 degrees C. and/or the like). For example, processor 125 may determine:

$$k_{slope} = (a_{T1} - a_{T2})/(T_1 - T_2) \quad (12)$$

Additionally, or alternatively, processor 125 may determine an intercept for the power curve:

$$b_{T_{Obs}} = b_{T_{Cal}} + k_{intercept}(T_{Obs} - T_{Cal}) \quad (13)$$

where $b_{T(Obs)}$ represents a corrected intercept of the power curve for the particular optical power range and at an observed temperature $T_{Obs}$, $b_{T(Cal)}$ represents a slope of the power curve for the particular optical power range at a calibration temperature $T_{Cal}$, and $k_{intercept}$ represents an experimentally derived intercept constant. In some implementations, $k_{intercept}$ may be temperature independent, thereby enabling processor 125 to determine or be configured with a value for $k_{intercept}$ determined using two or more calibration temperatures (e.g., 25 degrees C. and 70 degrees C. and/or the like). For example, processor 125 may determine:

$$k_{intercept} = (b_{T1} - b_{T2})/(T_1 - T_2) \quad (14)$$

In this way, processor 125 may determine corrected values for the corrected power curve at a particular temperature range where a temperature dependency results in an inaccuracy of the power curve, thereby improving an accuracy of optical power determinations performed using the power curve relative to using an uncorrected power curve. Moreover, based on modeling the power curve in the particular temperature range as a linear relationship between voltage and power and/or between voltage and current, processor 125 reduces a utilization of processing resources relative to attempting to correct a non-linear relationship for another temperature range greater than the particular temperature range. Furthermore, based on enabling a greater level of accuracy in optical power determinations, processor 125 enables improved performance and efficiency of systems including measurement device 105, such as optical communication systems and/or the like, relative to using other measurement devices with reduced accuracy relative to measurement device 105.

Figure 3C:
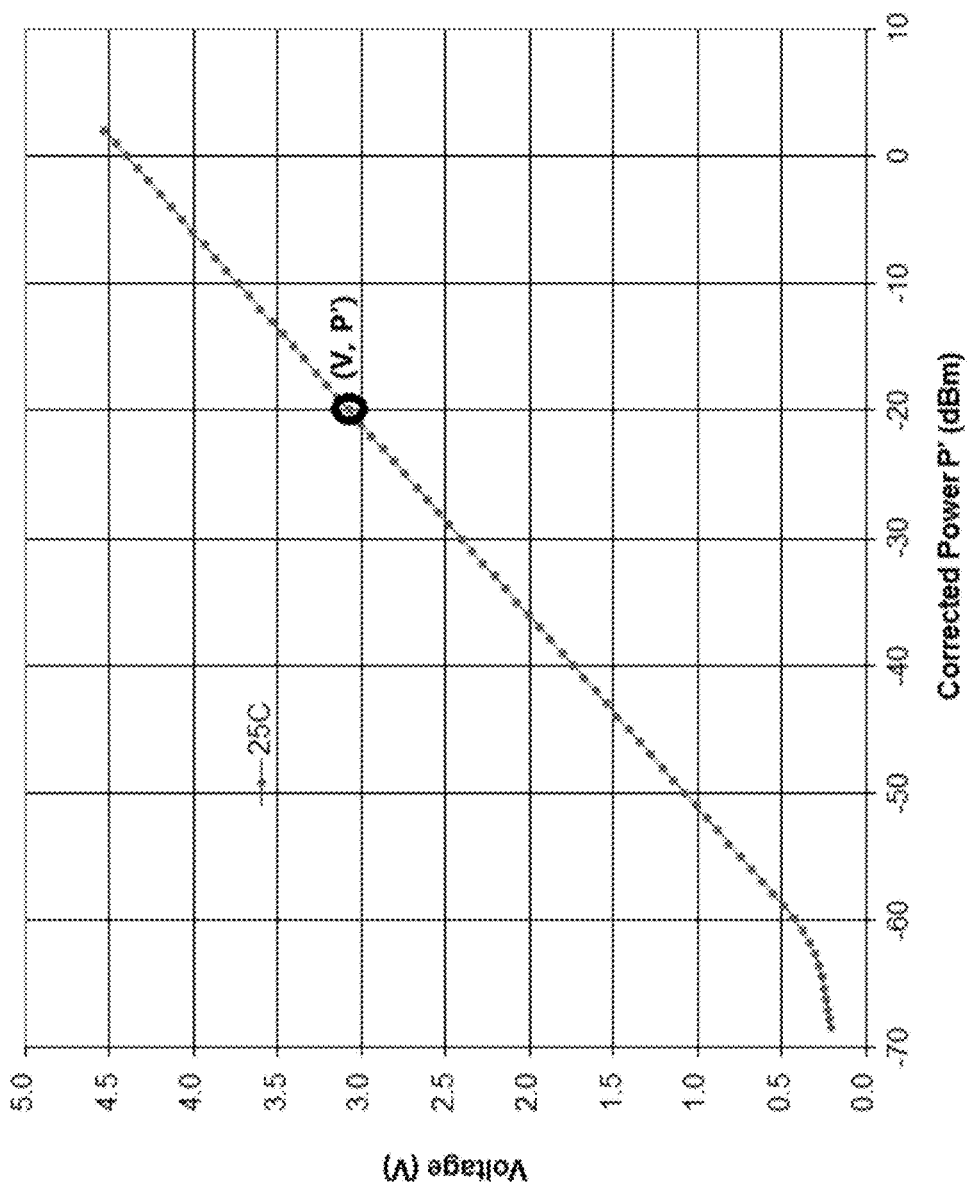

Using the values for the corrected slope and corrected intercept for the corrected current curve in the particular optical power range, and the current curve in other portions of an operating optical power range of measurement device 105, processor 125 may determine the corrected current curve, shown in FIG. 3B. Processor 125 may convert the corrected current curve to determine the corrected power curve at the calibration temperature:

$$P'_{T_{Cal}} = 10 \log \left( \frac{I'_{T_{Cal}}}{R_{PD}} \right) \quad (15)$$

where P' represents the corrected power curve at the calibration temperature and I' represents the corrected current curve at the calibration temperature. For example, as shown in FIG. 3C, and by chart 330, processor 125 may generate the corrected current curve.

Figure 3D:
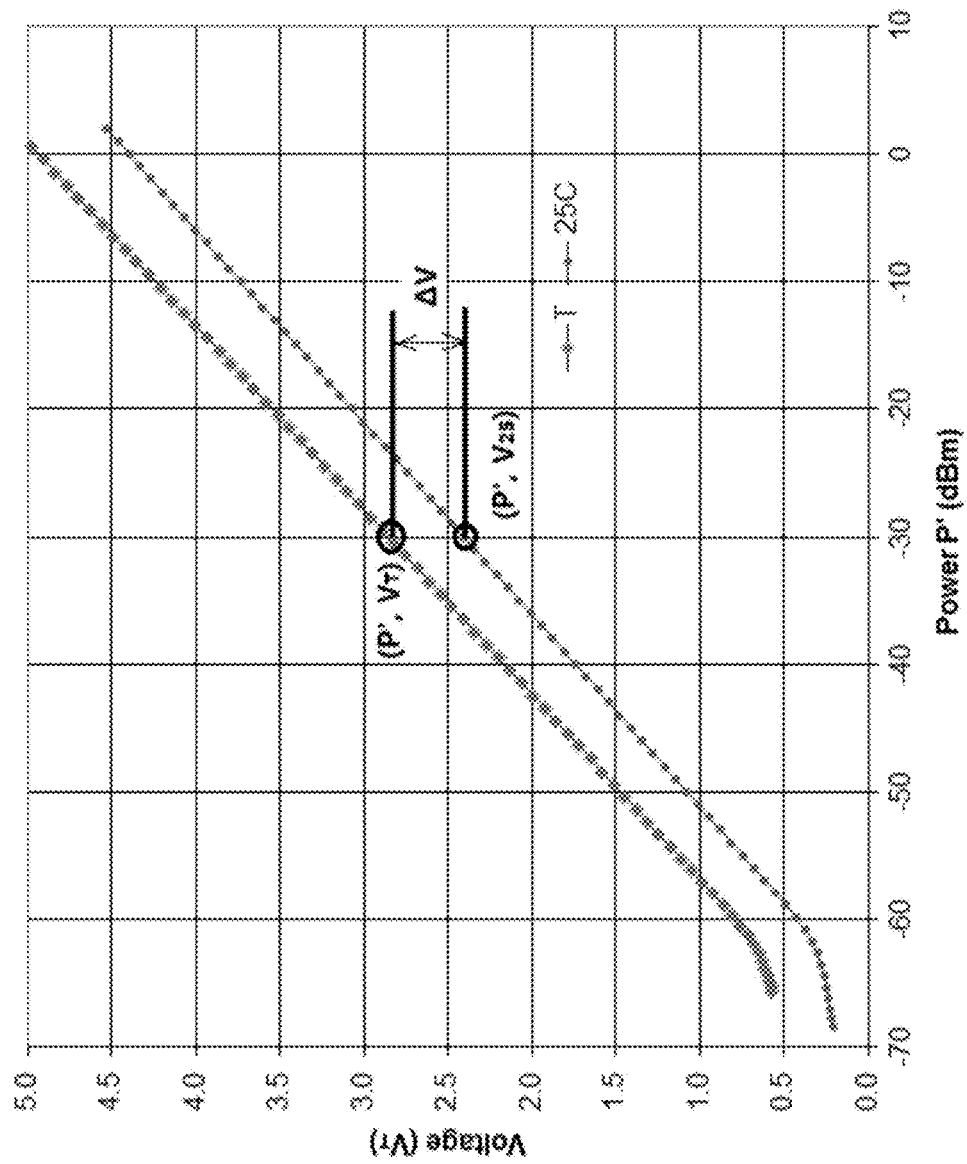

Based on determining the corrected power curve at the calibration temperature, processor 125 may generate the corrected power curve at the observed temperature:

$$V_{T_{Obs}} = V_{T_{Cal}} + \Delta V \quad (16)$$

$$\Delta V = (T_{Obs} - T_{Cal}) * \left( \frac{a_{P'}}{a_{T_{Obs}}} \right) * (k_{intercept} + P'_{T_{Cal}} * k_{slope}) \quad (17)$$

where $\Delta V$ represents a change to a voltage from a calibration temperature to an observed temperature. As shown in FIG. 3D, and by chart 340, based on determining $\Delta V$, processor 125 may determine a corrected power curve for the observed temperature.

Using linear interpolation on the corrected power curve, processor 125 may obtain a calibrated input optical power P''' using an equation:

$$P''_{T_{Obs}} = 10\log\left(10^{\frac{P'}{10}} - \frac{(I_{CC,T_{Obs}} + I_{DC,T_{Obs}})}{R_{PD}}\right) \quad (18)$$

where P'''$_{T(Obs)}$ represents the input optical power at an observed temperature $T_{Obs}$, P' is an input optical power determined based on linear interpolation from the corrected power curve, $I_{CC,T(Obs)}$ represents a calibration current value for the observed temperature, $I_{DC,T(Obs)}$ represents a dark current value for the observed temperature, and $R_{PD}$ represents a responsivity constant for photodiode 115.

Figure 3E:
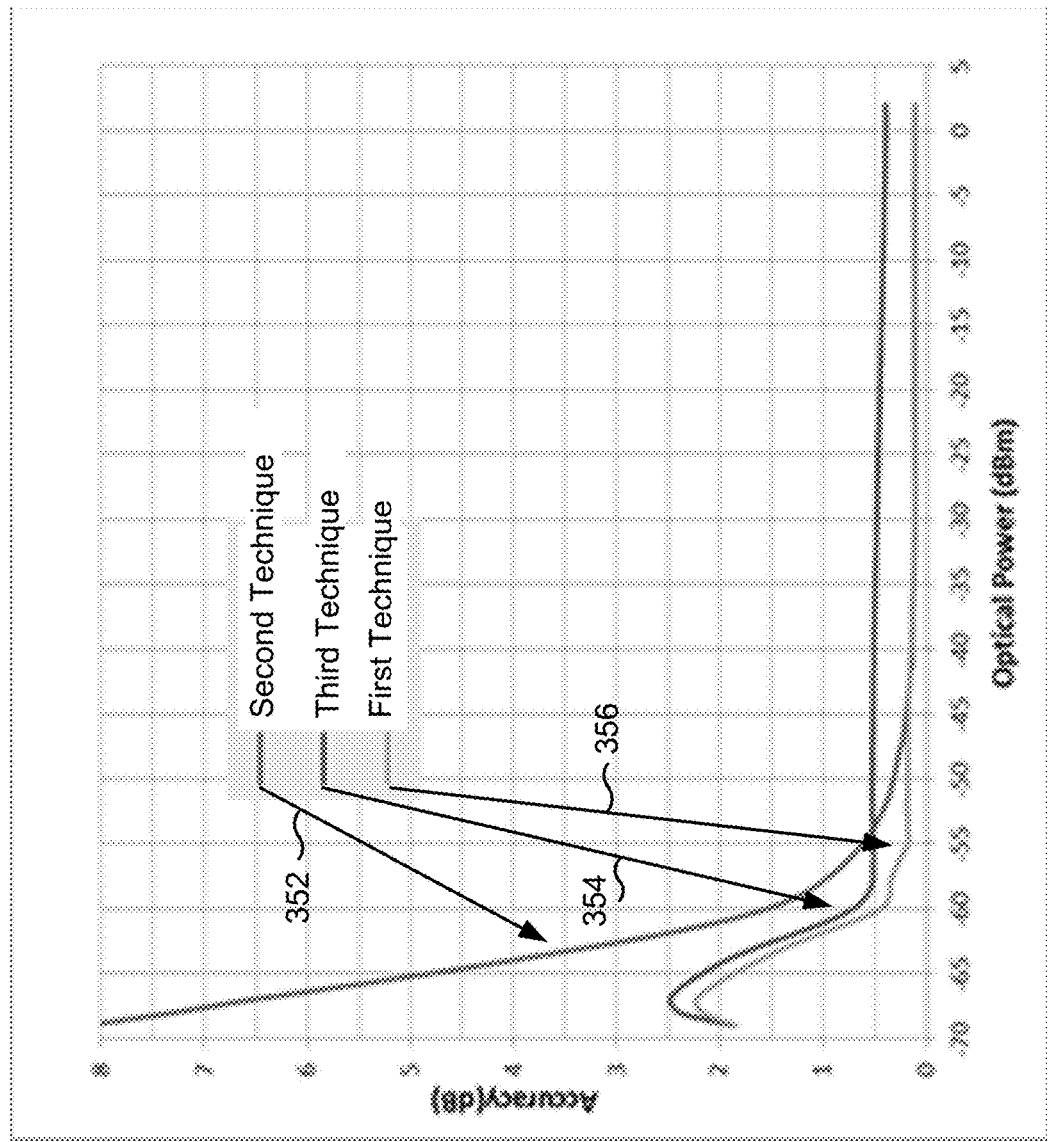

In this way, processor 125 may use a first technique to determine the input optical power with improved accuracy relative to other techniques for determining the input optical power. For example, as shown in FIG. 3E, and by chart 350, processor 125 may determine the optical power using the corrected power curve, as shown by reference number 352. An accuracy of the optical power determination may be within 0.5 dBm for an optical power range of between approximately −60 dBm and approximately 2 dBm, within 0.25 dBm for an optical power range of between approximately −55 dBm and approximately 2 dBm, within less than 0.25 dBm for an optical power range of between approximately −50 dBm and 2 dBm, and/or the like.

Similarly, an accuracy of the optical power determination may be within 2.5 dBm for an optical power range of approximately −68 dBm and approximately 2 dBm. In this way, processor 125 determines the optical power using two or fewer calibration temperatures for an optical power range of between, for example, approximately −9 dBm and approximately 2 dBm with an improved accuracy relative to other techniques. For example, processor 125 determines the optical power with an improved accuracy relative to, for example, a second technique wherein amplifier 120 is calibrated to input power at a discrete subset of temperatures and linear interpolation is performed, as shown by reference number 354, and with an improved accuracy relative to, for example, a third technique wherein the linear interpolation is adjusted based on a calibration current value, but without correcting for the particular temperature range using a set of slope and intercept values, as shown by reference number 356.

Returning to FIG. 2, process 200 may include providing information identifying the value for the input optical power (block 230). For example, processor 125 may provide, as output, information identifying the input optical power based on determining the value for the input optical power. In some implementations, processor 125 may provide the information identifying the input optical power for storage, such as in a log data structure. In some implementations, processor 125 may provide the information identifying the input optical power to another device. For example, in an optical communication system, measurement device 105 may provide the measurement of the input optical power to a transmitter device to enable dynamic control of the transmitter device. In this way, measurement device 105 enables measurement of the input optical power to photodiode 115.

Although implementations, described herein, are described in terms of one or more curves, charts, equations, and/or the like, these implementations may also be used with another data type, such as a data structure storing values, a lookup table, and/or the like.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel. As indicated above, FIGS. 3A-3E are provided merely as examples. Other examples are possible and may differ from what was described with regard to FIGS. 3A-3E.

In this way, measurement device 105 determines an optical power with improved accuracy relative to other techniques for determining the optical power. Moreover, measurement device 105 obviates a need for a thermoelectric cooler and a thermoelectric cooler controller, thereby reducing a utilization of energy resources, reducing cost, reducing form-factor, and/or the like. Furthermore, measurement device 105 determines the optical power with only two temperatures used for calibration of measurement device 105 rather than a greater quantity of temperatures resulting in excessive cost and/or calibration time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A measurement device, comprising:
a bias source to provide a bias;
a photodiode to provide a linear current based on an input optical power and the bias;
a log amplifier to receive the linear current and to provide a voltage;
a temperature sensor to determine an observed temperature; and
one or more processors to receive the voltage and to determine a measurement of the input optical power at the observed temperature,
wherein the measurement is determined based on:
a photodiode current corresponding to the voltage,
a dark current for the observed temperature, and
a calibration current for the observed temperature,
wherein the calibration current is determined, for a threshold power range, based on a first plurality of current measurements at a first temperature and at a plurality of optical powers, a second current measurement at a second temperature and at a first optical power, of the plurality of optical powers, and a third current measurement at the second temperature and at a second optical power, of the plurality of optical powers,
wherein a quantity of calibration temperatures used for calibrating the measurement device is two, including only the first temperature and the second temperature, for an optical power range of −9 decibel-milliWatts (dBm) to 2 dBm,
wherein the first temperature is different than the second temperature, and
wherein the first optical power is different than the second optical power.

2. The measurement device of claim 1, wherein an accuracy of the measurement is within 0.5 decibel-milliWatts (dBm) for an optical power range of between −60 dBm and 2 dBm.

3. The measurement device of claim 1, wherein an accuracy of the measurement is within 0.25 decibel-milliWatts (dBm) for an optical power range of between −55 dBm and 2 dBm.

4. The measurement device of claim 1, wherein an accuracy of the measurement is within 2.5-milliWatts (dBm) for an optical power range of −68 dBm to 2 dBm.

5. The measurement device of claim 1, wherein a step size of the plurality of optical powers is 1 decibel-milliWatts (dBm).

6. The measurement device of claim 1, wherein the first optical power is less than −55 decibel milliWatts (dBm).

7. The measurement device of claim 1, wherein the first optical power is 67 decibel milliWatts (dBm).

8. The measurement device of claim 1, wherein the second optical power is greater than −45 decibel milliWatts (dBm).

9. The measurement device of claim 1, wherein the second optical power is greater than −3 decibel milliWatts (dBm).

10. The measurement device of claim 1, wherein the second optical power is between 1 decibel milliWatts (dBm) and 2 dBm.

11. A method, comprising:
determining, by a device, a first plurality of current measurements at a first temperature and at a plurality of optical powers;
determining, by the device, a second current measurement at a second temperature and at a first optical power, of the plurality of optical powers,
the first temperature being different than the second temperature;
determining, by the device, a third current measurement at the second temperature and at a second optical power, of the plurality of optical powers,
the first optical power being different than the second optical power;
determining, by the device, an observed temperature using a temperature sensor;
determining, by the device, a calibration current for the observed temperature and a threshold power range based on the first plurality of current measurements, the second current measurement, and the third current measurement,
wherein a quantity of calibration temperatures used for calibrating the device is two, including only the first temperature and the second temperature, for an optical power range of −9 decibel-milliWatts (dBm) to 2 dBm;
determining, by the device, a photodiode current for the observed temperature;
determining, by the device, a dark current for the observed temperature; and
determining a measurement of an input optical power at the observed temperature based on the calibration current, the photodiode current, and the dark current.

12. The method of claim 11, further comprising:
receiving input identifying a measured voltage,
wherein the measured voltage corresponds to a linear current generated by a photodiode based on the input optical power and a bias; and
where determining the photodiode current comprises:
determining the photodiode current based on the measured voltage.

13. The method of claim 11, wherein the threshold power range is between −33 decibel milliWatts (dBm) and 2 dBm.

14. A device, comprising:
a temperature sensor to determine an observed temperature; and
a processor to determine a measurement of an input optical power at the observed temperature and to output information identifying the measurement of the input optical power at the observed temperature,
wherein the measurement is determined based on:
a photodiode current corresponding to a voltage,
a dark current for an observed temperature, and
a calibration current for the observed temperature,
wherein the calibration current for the observed temperature is determined based on a plurality of current measurements performed at a plurality of optical powers and at a first temperature and a second temperature,
wherein a quantity of calibration temperatures used for calibrating the device is two, including only the first temperature and the second temperature, for an optical power range of −9 decibel-milliWatts (dBm) to 2 dBm, and
wherein the first temperature is different than the second temperature.

15. The device of claim 14, further comprising:
a photodiode to provide a linear current based on the input optical power and a bias,
wherein the voltage is related to the linear current.

16. The device of claim 14, further comprising:
an amplifier to receive a linear current and provide the voltage based on the linear current.

17. The device of claim 14, wherein the processor is configured to determine the calibration current based on a responsivity of a photodiode that receives the input optical power.

18. The measurement device of claim 1, wherein the measurement is determined based on a corrected power curve,
wherein a corrected slope value for the corrected power curve is based on a slope constant derived using two calibration temperatures, which include only the first temperature and the second temperature.

19. The measurement device of claim 1, wherein the measurement is determined based on a corrected power curve,
wherein a corrected intercept value for the corrected power curve is based on an intercept constant derived using two calibration temperatures, which include only the first temperature and the second temperature.

20. The device of claim 14, wherein the measurement is determined based on a corrected power curve,
wherein a corrected slope value for the corrected power curve is based on a slope constant derived using two calibration temperatures, which include only the first temperature and the second temperature, and
wherein a corrected intercept value for the corrected power curve is based on an intercept constant derived using two calibration temperatures, which include only the first temperature and the second temperature.

* * * * *